United States Patent [19]

Prickett et al.

[11] Patent Number: 4,631,541

[45] Date of Patent: Dec. 23, 1986

[54] MICROPROCESSOR BASED PROGRAMMABLE FREQUENCY CONTROLLER FOR FREQUENCY AGILE RADAR

[75] Inventors: Michael J. Prickett; Murray H. Mott, both of San Diego; Nicholas Panos, El Cajon, all of Calif.

[73] Assignee: The United States of America as represented by the Secretary of the Navy, Washington, D.C.

[21] Appl. No.: 559,576

[22] Filed: Dec. 8, 1983

[51] Int. Cl.⁴ ......................... G01S 7/42; G01S 13/26

[52] U.S. Cl. .................................. 343/5 DP; 342/201

[58] Field of Search .............. 343/5 DP, 17.2 R, 17.5, 343/7.5; 364/516

[56] References Cited

U.S. PATENT DOCUMENTS

| | | | |
|---|---|---|---|
| 3,702,476 | 11/1972 | Nathanson et al. | 343/17.1 PF |
| 3,858,208 | 12/1974 | Parke et al. | 343/5 DP X |
| 3,900,846 | 8/1975 | Gibbon et al. | 343/5 DP X |
| 3,940,768 | 2/1976 | Olsen et al. | 343/18 E |
| 3,981,013 | 9/1976 | Christensen | 343/17.1 R |
| 4,023,169 | 5/1977 | Kolp et al. | 343/17.2 R |
| 4,038,659 | 7/1977 | Hamer et al. | 343/17.1 R |
| 4,041,487 | 8/1977 | Evans et al. | 343/7.5 |
| 4,071,844 | 1/1978 | Hopwood et al. | 343/17.2 R |
| 4,130,821 | 12/1978 | Goldie | 343/17.1 R |
| 4,155,088 | 5/1979 | Taylor et al. | 343/7.7 |
| 4,320,397 | 3/1982 | Constantinides | 343/5 DP X |
| 4,339,751 | 7/1982 | Pease | 343/5 DP |
| 4,356,490 | 10/1982 | Bray et al. | 343/17.2 R |

*Primary Examiner*—T. H. Tubbesing
*Assistant Examiner*—Gilberto Barrón, Jr.
*Attorney, Agent, or Firm*—Robert F. Beers; Ervin F. Johnston; Edmund W. Rusche, Jr.

[57] ABSTRACT

The invention is a programmable frequency controller for a frequency agile radar system. The system comprises a microprocessor which includes clock generator, a front panel radar parameter input unit, a program memory, data memory, a front panel radar an input buffer port, a microprocessor data bus, an output buffer port, a front panel display unit, a radar data collection system, a radar synthesizer output buffer unit, a radar frequency synthesizer, and a frequency agile radar system with antenna. The control system operates, monitors, and collects operational data during operation of the frequency agile radar system. Input control parameters are preset at the front panel radar parameter input unit. Program memory contains preprogrammed computer control instructions for the microprocessor in performing control and management of operational data during radar operation. The data memory unit provides capability of storing and transferring data during operation of the system. The front panel display allows for the display of selected parameters for real time monitoring of the system's operation. The radar data collection system is comprised of high speed, multichannel, magnetic tape recorder units which record select data for further or later processing. Operation of the radar system by the microprocessor is controlled through the synthesizer output port and the frequency synthesizer. The frequency synthesizer receives operational command from the microprocessor, interprets these commands, and generates the control frequency cycle by which the radar system is to operate. Necessary control functions for operation of the system occur within the pulse repetition time, which can be as short as 20 microseconds.

25 Claims, 1 Drawing Figure

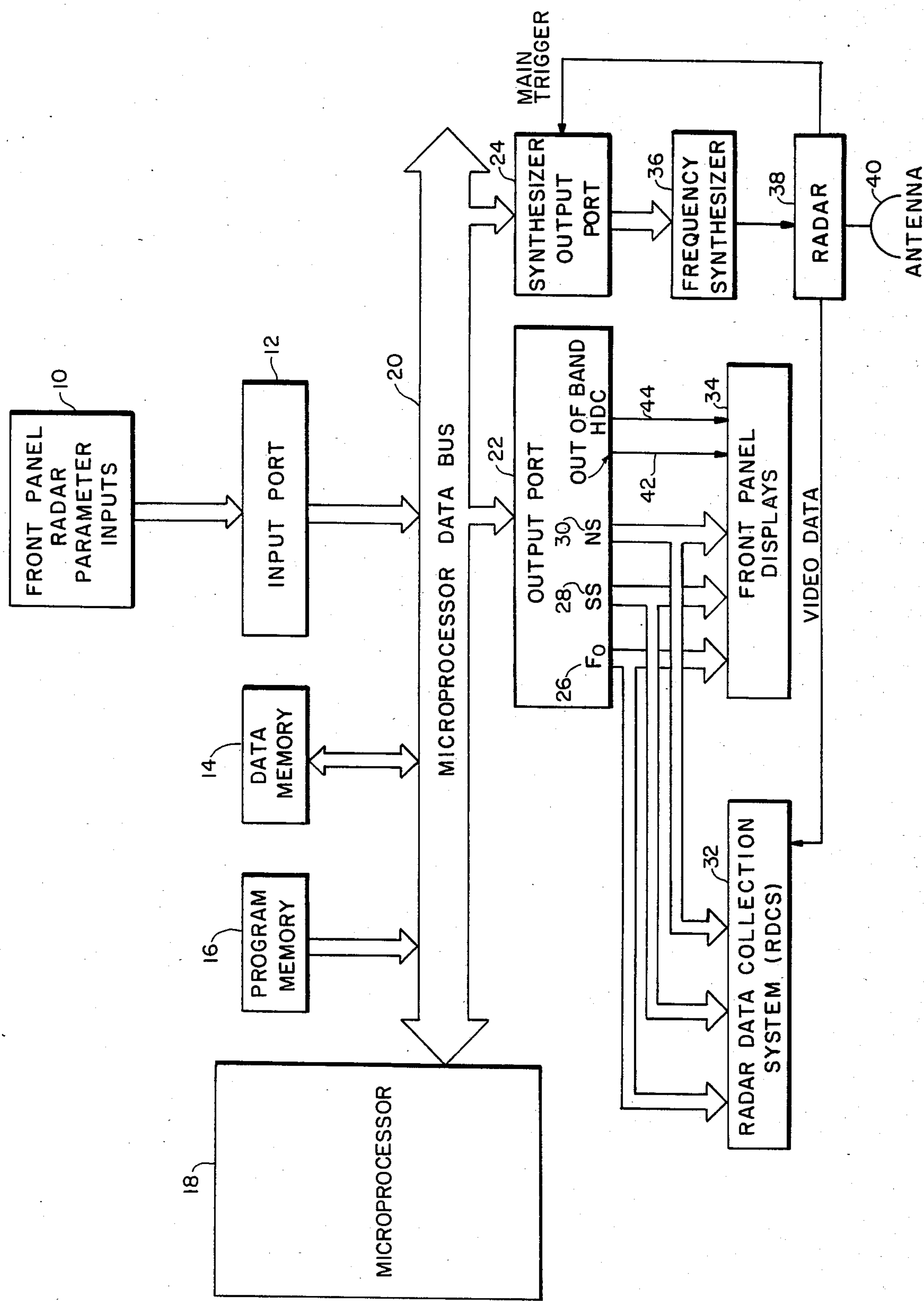
FRONT PANEL RADAR PARAMETER INPUTS
10
INPUT PORT
12
DATA MEMORY
14
PROGRAM MEMORY
16
MICROPROCESSOR
18
MICROPROCESSOR DATA BUS
20
OUTPUT PORT
22
SYNTHESIZER OUTPUT PORT
24
FO
26
SS
28
NS
30
OUT OF BAND
HDC
42
44
FRONT PANEL DISPLAYS
34
RADAR DATA COLLECTION SYSTEM (RDCS)
32
FREQUENCY SYNTHESIZER
36
RADAR
38
ANTENNA
40
MAIN TRIGGER
VIDEO DATA

MICROPROCESSOR BASED PROGRAMMABLE FREQUENCY CONTROLLER FOR FREQUENCY AGILE RADAR

STATEMENT OF GOVERNMENT INTEREST

The invention described herein may be manufactured and used by or for the Government of the U.S. of America for governmental purposes without the payment of any royalties thereon or therefor.

BACKGROUND OF THE INVENTION

Within the recent past an experimental imaging radar system has been developed which produces high resolution target images of ships and aircraft. A wideband frequency stepping technique is used to achieve high range resolution. Coherent signal processing produces high resolution in the cross range dimension.

Prior to this invention the controller for the radar system used unprogrammable hard wired components. The hard wired controller produced 1 to 512 discrete frequency pulses increasing monotonically with a constant step size of 1.08 MHz.

A microprocessor-based controller has been developed to improve control capability of the radar imaging system. The microprocessor-based controller provides for variable step size (0.1 through 99.9 MHz), more steps (up to 5,000) and programmable frequency sequences. The microprocessor is also used in making out-of-band and transmitter duty cycle limit calculations. The new controller provides the advantages of improved operational ease, extensive flexibility for image quality investigations, improved electronic counter countermeasures (ECCM), and the additional flexibility in programming various frequency sequences for image quality investigations. The new control system provides programming options for investigating image quality as a function of sample rate or of transmitted bandwidth.

Briefly, the invention generates control signals to a radar. These signals cause the radar to change frequency, pulse repetition frequency (PRF), and monitor transmitter duty cycle limits under the control of an internal stored program executed by a commercial microprocessor. A critical feature of the invention is due to the necessary control functions being completed within the pulse repetition time (as short as 20 microseconds).

SUMMARY OF THE INVENTION

The invention comprises a front panel radar parameter input component, input port, program memory, data memory, a microprocessor, a microprocessor data bus, a microprocessor output port, a synthesizer output port, a radar data collection system, front panel display component, a frequency synthesizer, a radar, and a radar antenna.

The front panel radar parameter input component feeds to the microprocessor data bus through the input port. Program memory and data memory feed directly into and through the microprocessor data bus. Program and operational control is enabled through themicroprocessor, which also connects through the microprocessor data bus. Output connection from the microprocessor data bus occurs to the output port and the synthesizer output port. The synthesizer output port feeds to the frequency synthesizer which then feeds the radar. The radar then energizes and transmits signals via the antenna. The output port's component outputs signals to the radar data collection system (RDCS) and the front panel displays.

OBJECTS OF THE INVENTION

An object of the invention is to present a microprocessor for controlling the frequency stepping function of a radar system.

Another object of the invention is to present a microprocessor system for controlling the operation of a frequency agile radar system.

A further object of the invention is to present a microprocessor controlling system for a frequency agile radar system which offers operational ease, extensive flexibility for image quality investigations, and improved electronic counter countermeasures (ECCM).

Other objects, advantages and novel features of the invention will become apparent from the following detailed description of the invention when considered in conjunction with the accompanying drawing.

BRIEF DESCRIPTION OF THE DRAWINGS

The FIGURE shows a diagram for the programmable frequency controller system for the frequency agile radar.

DESCRIPTION OF THE PREFERRED EMBODIMENT

The microprocessor based programmable frequency controller for frequency agile radar comprises as the primary components a microprocessor 18 and a microprocessor data bus 20 transceiver to transfer data between the input and output ports, 12 and 22, and the microprocessor. Inputting into the microprocessor data bus 20 is a front panel radar parameter input component 10 which inputs into an input port unit 12. The input port unit 12 then addresses themicroprocessor data bus 20. A program memory 16 inputs the microprocessor data bus 20. This program memory 16 contains the operational programs for controlling the performance and data collection of the radar system. A data memory unit 14 is attached to the microprocessor data bus to receive and send data through said data bus 20.

Output devices connected to the microprocessor data bus include an output port unit 22 and a synthesizer output port 24 which feeds to the radar system. The synthesizer output port 24 receives command signals through the microprocessor data bus 20 from microprocessor 18 and outputs a control signal to frequency synthesizer 36. Frequency synthesizer 36 then feeds signals to the radar system 38, which drives the antenna 40. A main trigger circuit is output from radar system 38 back to synthesizer output port 24.

Output port unit 22 is connected to output data signals for the initial frequency 70 of an output radar signal sequence, the step size ss of the incremental frequency to be added to the latest output frequency after each step of the sequence, and the number of frequencies ns in the sequence of the output frequency values. These data signals are output both to the front panel displays 34 and to radar data collection system 32. In addition, output port unit 22 transmits information concerning the existence of an out-of-band condition and of a high duty cycle (HDC) condition. This information is transmitted to the front panel displays 34.

The microprocessor-based frequency controller provides a means for generating three types of frequency sequences. The operator enters information to the controller via the front panel radar parameter input unit 10. This panel contains three sets of thumb wheel select switches used to adjust the parameters: $F_0$, the initial frequency of the output sequence of frequency burst; SS, the step size, i.e., the incremental value of frequency added to the latest frequency output to produce the next frequency burst in the output sequence; and NS, the total number of different bursts in the ouput sequence. The panel 10 also contains a rotary switch used to select one of three varieties for the output sequence, one toggle switch used to select either an S- band or an X-band range for the output sequence of frequencies, a RESTART push button to initiate new sequences, a rotary switch to select transmitter radio frequency pulse width (RFPW) for each frequency burst, and one set of thumb wheel select switches used to establish Unambiguous Maximum Range (UMR). The UMR is inversely proportional to radar transmitted pulse repetition frequency (PRF).

The rotary switch used to select one of three varieties of output sequences is a mode selector switch. There are three settings corresponding to the three types of sequences. The first is a stepped mode. In this mode, the frequency synthesizer 36 begins with an initial frequency $F_0$. A pulse called MAIN TRIGGER will cause this $F_0$ to be applied to the synthesizer. When the next MAIN TRIGGER pulse occurs, the step size (SS) is added to $F_0$ to generate the next frequency, $F_i$. With each subsequent MAIN TRIGGER, the frequency output of the synthesizer is incremented by SS, thus providing a step sequence of frequencies. The length of the sequence is determined by NS. Thus, $$F_i = F_0 + ix(SS)$$

$$i = 0, 1, 2, \ldots (NS-1).$$

At the end of the sequence, an END OF THE SEQUENCE (EOS) pulse is generated, and the sequence begins again with $F_0$. The same sequence is repeated indefinetly, or until the RESTART push button is activated. RESTART can be used to go to new desired parameters.

The second mode is the return-to-$F_0$ mode. This mode is similar to the stepped mode except that the synthesizer output frequency returns to $F_0$ every other step. Thus, for NS=4, the sequence is $$F_0,\ F_0+SS,\ F_0,\ F_0+2SS,\ F_0,(F_0+3SS) \text{ with EOS.}$$

This sequence repeats indefinitely, or until interrupted by RESTART.

The third mode is the fixed mode. The frequency synthesizer is set for $F_0$. SS is not used. NS still defines when the EOS pulse occurs. The input port 12 consists of transistor-transistor logic (TTL) buffers. These buffers interface the transfer of the data entered into front panel radar parameter input unit 10 to the microprocessor data bus 20. In addition, the RFPW input and the UMR input come from front panel radar parameter input unit 10. These settings are used by the microprocessor to 18 check transmitter duty cycle.

The output port unit 22 consists of TTL storage registers.

The front panel displays 34 are light-emitting diode (LED) displays. The information displayed is the initial frequency $F_0$, the step size SS, and the number of frequencies NS. In addition, two single LED indicators represent frequency out-of-band and trasmitter high duty cycle (HDC) conditions.

The radar data collection system (RDCS) 32 receives the same information as that sent to the displays. The RDCS 32 is comprised of high speed multi-channel magnetic tape units for recording and storing the operational data.

The synthesizer output port 24 consists of a TTL storage register. The binary representation of the next frequency value is transferred from the microprocessor 18 to the synthesizer 36 through this port 24. The transfer is initiated by the MAIN TRIGGER pulse which emanates from the radar system 38. The synthesizer 36 produces a sine wave output at the precise frquency determined by its binary inputs.

The microprocessor 18 provides a computational and control function for the entire system. Contained within microprocessor 18 or attached to it is a clock generator for timing control. The clock generator also synchronizes the READY signal. The READY feature is used to stop the microprocessor 18 whenever a new frequency has been prepared for the synthesizer 36. When the next MAIN TRIGGER occurs, the synthesizer 36 receives the new frequency at the same time that the microprocessor 18 proceeds to compute the next frequency. The effect is that the microprocessor/synthesizer interface has been pipelined; thus, the stabilization delay of the synthesizer and the computation delay of the microprocessor occur simultaneously rather than in sequence.

The program memory 16 contains the program which activitates all these circuit resources to produce the operational characteristics. The program controls the collecting of thumb wheel settings and a computation of whether the sequence defined includes one or more frequencies outside the range of the synthesizer 36. The occurrence of such is called the OUT-OF-BAND condition. The program controls the monitoring of RFPW and UMR inputs and calculates whether a transmitter HIGH DUTY CYCLE (HDC) condition exists.

If an OUT-OF-BAND and/or HDC condition exists the program will shut off the synthesizer 36 until the condition is corrected. Thereafter, the RESTART push button must be activated to initial the sequence. If RESTART has been pushed, and there is no longer an OUT-OF-BAND or HDC condition, the microprocessor 18 proceeds to compute and output the sequence of frequencies selected.

If, while a sequence is in progress, RESTART is activated, a change of rotary mode switch occurs, or a change in the S-band/X-band toggle switch occurs, the synthesizer 36 is shut off by the program. This must be followed by entering a new sequence (provided OUT-OF-BAND or HDC conditions do not exist for this new sequence).

If, during a sequence, the RFPW or UMR settings are changed, the program causes the microcomputer 18 to turn off the synthesizer 36 and to compute continuously the HIGH DUTY CYCLE with results reflected on the front panel HDC LED. Now, a new sequence can be initiated only by pushing RESTART (after HDC condition, if any, is corrected).

In the preferred embodiment the microprocessor is a Model 8086 Intel Corporation microprocessor unit. It has the Intel Model 8284 clock generator and a standard data bus transceiver to transfer data between the input-output ports in the microprocessor. The program memory 16 consisted of two Intel Corporation Model 2716 ultraviolet light ERASABLE PROGRAMMABLE READ ONLY MEMORY (EPROM) integrated circuits, each of which provided 2048 bites of permanent storage. The data memory 14 consisted of four Intel Corporation Model 2142 semiconductor RANDOM ACCESS MEMORY (RAM) integrated circuits. Together, these RAM's provided 2048 bites of storage for variable data. A critical feature accomplished with this invention is the necessary control of the operational functioning within the pulse interval time of as short as twenty microseconds. In addition, this system allows programming flexibility for the investigation of image quality of the radar received waveforms as a function of sample rate or transmitted bandwidth.

Obviously many modifications and variations of the present invention are possible in the light of the above teachings. It is therefore to be understood that within the scope of the appended claims the invention may be practiced otherwise than as specifically described.

What is claimed is:

1. A programmable stepped frequency controller for frequency agile radar which comprises:

means for receiving input radar control parameters, said control parameters being entered by the system operator;

means for retaining a computer program, said computer program constructed to provide operational control and data transfer management directions for the system;

means for storing data, said storing means being able to receive or transmit data pertaining to the operation of the frequency agile radar system;

means for processing and controlling, said processing means capable of executing the computer program contained in the retaining means, of processing data during operation of the radar system, and of controlling the operation of the frequency agile system;

means for transceiving data and operational commands between the components of the programmable frequency controller, said transceiving means being connected to receive signals from the receiving means, and the retaining means, being connected to send and receive data signals from the storing means, and being connected to receive and send control and data signals to the processing means;

means for synthesizing a radar signal to control the method of radar transmission from a radar system and antenna, said synthesizing means attached to the transceiving means for receiving control and data signals from the processing means to creae a predetermined frequency, bandwidth, and repetition rate radar signal;

means for outputting data information, said outputting means being connected to receive the data information from the transceiving means as controlled by the processing means, and said data including operational information for the frequency agile radar system;

means for displaying the data information outputted to the outputting means, said displaying means being connected to the outputting means to receive said data; and means for collecting said data information, said colecting means connected to receive select data from the outputting means and also connected to receive select data from the radar system, and said collecting means capable of holding said data for further processing;

wherein the means for receiving input control parameters comprises:

a plurality of adjustable switches for selectably setting the control radar parameters which include the initial frequency of the output sequence of frequency bursts, the step size of the incremental value of frequency added to the latest frequency output to produce the next frequency burst in the output sequence, the total number of different frequency bursts in the output sequence, the mode for the output sequence, the type of radar band to be used for the output sequence of frequencies, a restart function to initiate new sequences, the radiofrequency pulse width for each frequency burst, and an unambiguous maximum range parameter.

2. A programmable frequency controller for frequency agile radar according to claim 1 wherein the means for processing comprises:

a microprocessor.

3. A programmable frequency controller for frequency agile radar according to claim 2 wherein the retaining means comprises:

one or more erasable read-only memory (EPROM) integrated circuits.

4. A programmable frequency controller for frequency agile radar according to claim 3 wherein the means for storing comprises:

one or more semiconductor random access memory (RAM) integrated circuits.

5. A programmable frequency controller for frequency agile radar according to claim 4 wherein the means for synthesizing further comprises:

a synthesizer output port connected to the transceiving means which receives control signals from the microprocessor;

a frequency synthesizer connected to the synthesizer output port, said frequency synthesizer capable of producing an output signal at precise frequencies as predetermined by its input from the synthesizer output port; and a radar system including the radar antenna connected to the output of the frequency synthesizer, said radar system also connected to the synthesizer output port for transmitting a main trigger signal for correlating theemission timing for radar transmission, said radar system also connected to feed operational data to the means for collecting data.

6. A programmable frequency controller for frequency agile radar according to claim 5 wherein the outputting means comprises:

TTL storage registers.

7. A programmable frequency controller for frequency agile radar according to claim 6 wherein the means for collecting data comprises:

one or more high speed, multi-channel magnetic tape recording units.

8. A programmable frequency controller for frequency agile radar according to claim 7 wherein the means for displaying comprises:

a plurality of light-emitting diode integrated circuits for displaying the information parameters which include the initial frequency of the output sequence of frequency bursts, the step size of the incremental value of frequency added to the latest frequency output to produce the next frequency burst in the output sequence, the total number of different frequency bursts in the output sequence, an out-of-band indicator, and a high duty cycle condition indication.

9. A programmable frequency controller for frequency agile radar according to claim 8 wherein the erasable programmable read-only memory integrated circuit comprises:

one or more ultraviolet light erasable programmable read-only memory (EPROM) integrated circuits.

10. A programmable frequency controller for frequency agile radar according to claim 9 wherein the means for transceiving comprises:

a standard data bus transceiver to transfer data between the input/output ports and the microprocessor.

11. A programmable frequency controller for frequency agile radar according to claim 10 wherein the means for processing further includes:

an external clock generator.

12. A programmable stepped frequency controller for frequency agile radar which comprises:

a microprocessor for controlling operation of the radar system, and for preprocessing and managing operational data during system operation;

a microprocessor data bus connected to the microprocessor;

a program memory connected to the microprocessor data bus;

a data memory connected to the microprocessor data bus;

a front panel radar parameter input unit;

an input port unit connected between the front panel radar parameter input unit and the microprocessor data bus;

an output port unit connected to the microprocessor data bus;

a front panel display unit connected to the output port unit;

a radar data collection system connected to the output port unit;

a synthesizer output port connected to the microprocessor data bus;

a frequency synthesizer connected to the output of the synthesizer output port; and a radar system including antenna connected to the output of the frequency synthesizer, said radar system being connected to deliver a trigger signal to the synthesizer output port, and also being connected to deliver select operational data to the radar collection system;

wherein the front panel radar parameter input unit comprises a plurality of adjustable switches for presetting control parameters which include the initial frequency of the output sequence of frequency bursts, the step size of the incremental value of frequency netted to the latest frequency output to produce the next frequency burst in the output sequence, the total number of different frequency bursts in the output sequence, the particular output sequence mode of operation, the radar frequency band for the output sequence of frequencies, a restart function to initiate new sequences, a radio-frequency pulse width for each frequency burst, and an unambiguous maximum range parameter.

13. A programmable frequency controller for frequency agile radar according to claim 12 wherein the program memory comprises:

one or more erasable programmable read-only memory (EPROM) integrated circuits.

14. A programmable frequency controller for frequency agile radar according to claim 13 wherein the data memory comprises:

one or more semiconductor random access memory (RAM) integrated circuits.

15. A programmable frequency controller for frequency agile radar according to claim 14 wherein the input port unit comprises:

transistor-transistor logic (TTL) storage registers.

16. A programmable frequency controller for frequency agile radar according to claim 15 wherein the output port unit comprises:

transistor-transistor logic (TTL) storage registers.

17. A programmable frequency controller for frequency agile radar according to claim 16 wherein the synthesizer output port comprises:

transistor-transistor logic (TTL) storage registers.

18. A programmable frequency controller for frequency agile radar according to claim 17 wherein the radar data collection system comprises:

one or more high speed multichannel magnetic tape recorder units.

19. A programmable frequency controller for frequency agile radar according to claim 18 wherein the front panel display unit comprises:

a plurality of light emitting diodes (LED) integrated circuits for displaying data information which includes the initial frequency of the output sequence of frequency bursts, the step size of the incremental value of frequency added to the latest frequency output to produce the next frequency burst in the output sequence, the total number of different frequency bursts in the output sequence, frequency out-of-band condition, and transmitter high duty cycle condition.

20. A programmable frequency controller for frequency agile radar according to claim 19 wherein the erasable programmable read-only memory for the program memory unit further comprises:

one or more ultraviolet light erasable programmable read-only memory integrated circuits.

21. A programmable frequency controller for frequency agile radar according to claim 20 wherein the microprocessor further includes:

an external clock generator.

22. A programmable stepped frequency controller according to claim 1, wherein:

the step size of the incremental value of frequency added to the immediately prior frequency output may have a variable step size of 0.1 through 99.9 MHz.

23. A programmable stepped frequency controller according to claim 22 wherein:

the incremental frequency steps may comprise up to 5000 steps.

24. A programmable stepped frequency controller according to claim 12, wherein:

the step size of the incremental value of frequency added to the immediately prior frequency output may have a variable step size of 0.1 through 99.9 MHz.

25. A programmable stepped frequency controller according to claim 24 wherein:

the incremental frequency steps may comprise up to 5000 steps.

* * * * *